UNITED STATES PATENT OFFICE.

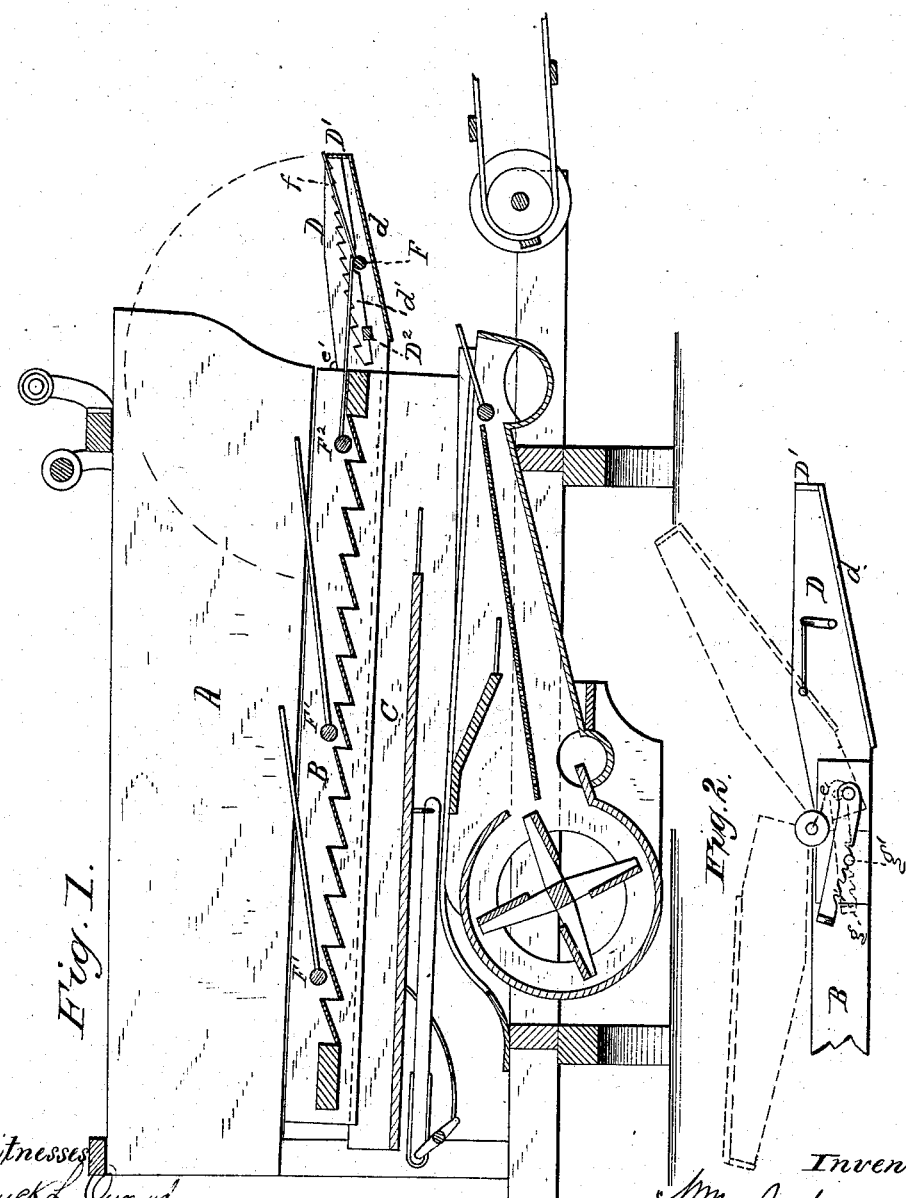

WILLIAM ACKERMAN, OF MANSFIELD, OHIO, ASSIGNOR TO THE AULTMAN & TAYLOR COMPANY, OF SAME PLACE.

GRAIN-SEPARATOR.

SPECIFICATION forming part of Letters Patent No. 237,460, dated February 8, 1881.

Application filed July 7, 1879.

*To all whom it may concern:*

Be it known that I, WILLIAM ACKERMAN, of Mansfield, county of Richland, State of Ohio, have invented certain new and useful Improvements in Grain-Separators, of which the following is a full, clear, and exact description, reference being had to the accompanying drawings, making part of this specification, in which—

Figure 1 represents a vertical longitudinal section through a grain-separating attachment to thrashing-machines, or so much thereof as is necessary to illustrate my improvements; and Fig. 2 is a side elevation of a portion thereof, showing the hinged extension-pan and means for effecting its adjustment.

Similar letters of reference denote corresponding parts in both figures.

The invention consists in the combination, with the straw carrier or separator, of a hinged adjustable and folding extension, by means of which the action of the carrier upon the straw and grain can be regulated and the discharge of the straw or tailings retarded at will, for causing the thorough separation of the grain therefrom, as hereinafter explained.

In the accompanying drawings, A represents the main frame of the separator; B, the vibrating straw-carrier, and C the vibrating grain-conveyer, said parts being similar in their construction and arrangement to the corresponding parts described in the patent granted to Joseph Allonas, October 22, 1878, No. 209,208, my invention being applicable to the machine described therein as an improvement.

D is an extension-pan, shown connected, in the present instance, with the discharge end of the straw-carrier by hinges $e\ e'$, arranged at its sides and at or near the upper edge of its side plates or boards, in such relation thereto as to permit the pan to fold over upon the carrier for packing or transportation, as indicated by dotted lines, Fig. 1. With certain conditions of the grain it may be found preferable to hinge this extension to the lower shaker in the position shown in the patent to Allonas referred to. This extension-pan is made in the form of a long, shallow box or pan, open on top and at its inner or receiving end, adjacent to the straw carrier or shaker, and has its bottom or flooring $d$ set inclining from its outer end inward, forming a return-chute, which serves to return the grain separated from the straw in the passage of the latter over it, and to deposit the same upon the lower shaker or screen. Above this flooring $d$ is arranged a series of longitudinal strips, $d'$, supported at their outer ends by the end bar or plate, D', and at their inner ends by a transverse bar, $D^2$, raised above the flooring, as shown, to permit the unobstructed return of the grain. The strips $d'$ are provided on their upper faces with a series of steps inclined on their inner or forward faces, with square or abrupt shoulders at their rear ends, said steps permitting the straw to move readily outward over them, but preventing its return or backward movement. The inclined faces of these steps may be covered with slats similar to those shown applied to the straw-carrier B, if desired.

F is a rock-shaft, arranged in bearings in the side boards or plates of the extension-pan, and provided with a series of fingers, $f$, intermediate between and alternating with the stepped strips $d'$, the shaft being arranged below the upper face of said strips, out of the way of the moving straw, and the fingers $f$, when depressed, also drop below said upper face in such manner as not to interfere with the action of the steps in holding the straw. Where the slats are employed the fingers will necessarily be arranged above them. The shaft F in practice is provided with a crank arm or arms, connected by a strap or link with a fixed part of the frame in such manner that as the carrier or shaker and the extension-pan are vibrated or thrust outward a rocking movement is imparted to the shaft, lifting the fingers and giving a tossing movement to the straw for effecting the separation of the grain therefrom.

The means for operating said shaft and fingers are similar to those in common use for operating similar shafts and fingers F' $F^2$, &c., applied to the straw-carrier B. The fingers of one shaft overlap the succeeding shaft, those of the last shaft, $F^2$, overlapping the shaft F of the extension, (or the first, where more than one is used.) By this arrangement the straw is agitated by the fingers throughout its entire passage over the carrier and the hinged extension. The side bars of the extension-pan, or the plates of the hinges connecting them with the straw-carrier, have toothed or ratchet-bars $g$ pivoted to them, said bars engaging with pins or studs $g'$ on the carrier, as shown, for holding the extension-pan at any desired angle of adjustment. By this arrangement greater or less resistance is offered to the discharge of the straw, as may be necessary for effecting the thorough separation of the grain therefrom.

Other means may be employed for effecting the adjustment of the hinged extension, and a different arrangement may be made of the hinge or hinges connecting it with the straw-carrier or the lower shaker.

Parts of the machine not particularly described may be constructed and arranged in any usual or preferred manner.

Having now described my invention, I claim—

1. The vibrating straw carrier or shaker, provided with the hinged folding extension projected beyond the machine-frame, in combination with the adjusting rod or bar for holding said extension at any desired angle of adjustment, substantially as described.

2. The hinged adjustable and folding extension of the straw carrier or shaker, in combination with longitudinally-arranged lifting-fingers applied to and adapted to be folded out of the way with said extension when not in use, substantially as described.

WM. ACKERMAN.

Witnesses:
J. H. MILLER,
L. A. ARMENTROUT.